Patented June 15, 1954

2,680,995

UNITED STATES PATENT OFFICE 2,680,995

METHOD OF MAKING HARDBOARD

Orcutt W. Frost, Gaston, and Gordon E. Tower, Forest Grove, Oreg., assignors to Stimson Lumber Company, Forest Grove, Oreg., a corporation of Oregon No Drawing. Application December 1, 1950, Serial No. 198,743

16 Claims. (Cl. 92—39)

This invention relates to hard, hot-pressed, cellulosic, structural products, as, for example, boards made from wood fiber, and known in the lumber industry under the name "hardboard." The invention is particularly concerned with a method of treatment during the manufacturing process to provide improved properties for the board, and the formulation of materials used in said method.

More specifically, the present invention relates to the "wet" process of forming hardboards or sheet lumber in which wood or other cellulosic fibers are prepared in a slurry and then formed in a wet lap by a suitable board forming machine, such as by deposition upon a wire screen, and in the Fourdrinier process, which is then transferred to hot presses where the water is driven out and the fibers are consolidated and coalesced into a hard board, resembling lumber, but without grain. There is disclosed, in accordance with the present invention, a method for improving the flexural strength as determined by modulus of rupture, the water resistance, and other properties of the board, by providing a treatment of the fibers in the slurry stage with a thermosetting resin, which treatment will herein be referred to as the "integral" treatment, and then, after the fibers have been formed into the wet lap, and while the pre-form mass is still wet, applying a "surface" treatment to the wet lap which comprises impregnating the wet lap with a thermosetting resin of special characteristics as will be hereinafter described. The wet lap is then transferred to the hot press, and after pressing, is removed from the hot press in finished state of manufacture, but having the improved properties as aforesaid. Boards having some of the improved properties obtained by the present process have been obtained heretofore, but such prior art boards generally required two separate operations—one for pressing and one for treating and baking, with the baking operation lasting as long as fourteen hours. The present invention provides boards of improved properties equal to and for some particular properties exceeding the properties of the prior art boards, with greatly reduced time of manufacture, and, inasmuch as time is one of the principal elements of cost, greatly reduced cost of manufacture.

It is, therefore, an object of the present invention to provide a hard, structural board, by an improved process wherein cellulosic fibers in slurry form are treated with a synthetic, thermosetting resin, and then, wherein the wet lap formed, before hot pressing or drying, is subjected to a surface treatment with a resin of the thermosetting type.

It is a further object of the invention to provide a hard, structural board of the character of hardboard, wherein the board, after its formation in wet lap, is subjected to but a single hot pressing operation without post-baking treatment.

It is a further object of the invention to provide a hard, structural board of the character of hardboard, wherein the board in wet lap form is provided with a surface treatment of a synthetic resin of the thermosetting type having specially controlled properties.

It is still another object of the invention to provide a novel formulation for use in surface treating a hardboard during its process of manufacture.

Other objects and advantages of the invention will appear from the following detailed description. In general, the objects of the invention are directed toward the making of boards for any predetermined density range having physical test properties, workability and appearance equal or superior to commercially available boards of the prior art in corresponding density range, but employing more economical methods than those heretofore used in the art.

A preferred embodiment for practicing the invention will next be described. While the process of the present invention is concerned with the treatment of the fibers with resin in the "integral" and "surface" treatments as explained above, the surface treatment with resin is dependent, in turn, on the texture of the board, and it is, therefore, desirable in the practice of the present invention to prepare the fiber with greater care and control than is customary in the production of fiber for the manufacture of conventional boards of the prior art. The process of the present invention may, therefore, be said, in its entirety, to involve the novel exercise of control at each step of the process beginning with the preparation of the fiber, in order to contribute to the improved end result. The strength developed in the finished board is closely related to the strength inherent in the pulp. The description of the process will therefore begin with the preparation of the fiber.

The fiber employed is exemplified by that manufactured from Douglas fir as prepared by the process and machine disclosed in Asplund Patents No. 2,008,892 and No. 2,145,851 but with appropriate modifications of said process and machine. The steam pressure in the Asplund machine is varied from 100 pounds per square inch to 175 pounds per square inch, depending on the raw material, the amount of subsequent refining to be given, and the tonnage through the machine. Subjecting the fiber to too high temperatures in the Asplund machine or for too long a time at a given temperature within the acceptable range results in the production of fiber of inferior quality, and should therefore be avoided. Steam pressures near 100 pounds per square inch are preferred when considerable incipient decay is present in the wood chips fed to the machine, as the fiber produced at the lower steam pressures results in the production of a stronger board.

It is beneficial to remove from the fiber the over-size particles consisting of the larger shives. It will be understood, however, that the improvement in properties contributed by the present invention will be obtained when making boards from any fiber customarily used in the art for the making of compressed fiber boards, and even though the pulp quality is not controlled to the extent described herein; likewise that the fiber may be prepared from other woods or other cellulosic materials such as straw, cornstalks, bagasse and the like which are often used in this art. The fiber quality is determined by freeness and bulk tests as are customary in the art. The values for freeness and bulk tests which are acceptable for different species and kinds of fiber is a matter for determination by the operator within the exercise of his skill, and by the end results desired.

In the preferred practice of the present invention, the fiber obtained from the Asplund machine is subjected to a further refining treatment in any suitable pulp refining machine. A Bauer pulper is preferred.

After the preparation of the fiber, the hardboard process proper, for the purpose of illustrating the present invention may be said to comprise four procedural steps as follows: (1) the mixing step conducted in a mixing chest during which the resin is added to the fiber slurry for the "integral" treatment; (2) the forming step in which the fibers are formed into the pre-form or wet lap sometimes referred to as the "sheet"; (3) the "surface" treatment during which the surface volume of the board preform is impregnated with the specially prepared mix of treating materials; and (4) the hot-pressing step.

THE MIXING STEP

The refined pulp from the Bauer machine is mixed with water to form a slurry and stored in a chest from which it is continuously pumped to a second or mixing chest. The fiber slurry is made up usually of a consistency of from 2½ to about 4%. By consistency, is meant the parts per dry weight of fiber to 100 parts by weight of mixture. To the mixing chest there is also added an aqueous solution of a thermosetting resin which is water soluble at a pH in the general range above a pH of 7, but which is water insoluble at pH below 7.0. The resin is for the purpose of coating or impregnating, or both, the cellulosic fibers, which action constitutes the "integral" treatment. A phenol-formaldehyde resin of the type described by Redfern in his Patent No. 2,457,493, which is represented by the resin sold commercially by American-Marietta Company as No. 118 phenolic resin, has been found to be quite satisfactory for this use. Other phenol-formaldehyde resins which have been found to be satisfactory are one sold commercially by Monsanto Chemical Company under the number P588 and one by Reichold Chemical Company as No. 1140.

In the preferred practice of the invention, there is also added to the fiber slurry in the mixing chest a water dispersible emulsion of a wax to provide sizing for the fibers and water repellancy to the finished board. This wax emulsion is preferably of paraffin or microcrystalline wax, such as are commonly used in the art for this purpose. The phenolic resin and wax emulsion are preferably made up in a combined liquid mixture containing about 15% of resin and wax on a solids basis. Typical usages of resin are 3.25% of resin solids and 0.7% of wax emulsion solids based on the dry weight of the fiber. The 15% mixture of resin and wax is then diluted to approximately 2% before mixing with the pulp.

The amount of resins added to the pulp affects both strength and water resistance of the board. The resin usage may conveniently range from small amounts up to 5%, or higher, based on the dry weight of the fiber, but 3 to 4% is preferred, as the strength-resin content curve starts to level off at this usage, and strength increases only slightly for each additional increment of resin. Resistance to water absorption and to swelling are increased, however, in a fairly sharply ascending curve with increased resin usage, although the relationship is not one of direct proportion.

The wax solids may conveniently range from 0.5 to 1.0% based on the dry fiber content, and larger amounts may be used, if desired.

As noted above the resin becomes insoluble, and will therefore coagulate or precipitate when the pH of its vehicle is reduced below 7.0. The fiber slurry, due to the presence of wood acids, normally has a pH below 7.0. It is desired to keep the resin-wax mixture in contact with the fiber for a minimum of one hour before completing precipitation of the resin which results in greater retention of the resin by the fibers. The resin is preferably selected with characteristics such that a portion of the resin remains in solution during the mixing period, as in this way intimate mixing of the resin with the fiber is promoted.

In order to maintain some of the resin in solution form, it is therefore necessary to maintain the pH of the pulp-resin-size mixture above 7.0 and preferably in a range from 7.3 to 7.7.

The resins which may be used, including those mentioned above, are normally alkaline, but may not contain enough alkalinity to raise the pH of the fiber slurry to a value of not less than 7 when using only 3.25% resin addition. Therefore, an alkaline material, preferably sodium hydroxide, may be added to the mixing chest, before adding the resin, in sufficient quantity to maintain the pulp plus resin and size in the mix chest at a pH of 7.0 to 7.7. Resin retention by the fiber upon subsequent acidification continues to improve as the pH of the pulp-resin-size mix is raised up to a pH of 9.0 during the soaking period. However, the resin retention-pH curve is levelling off and increased use of caustic is required to increase the pH, and then increased use of acid is required to lower it again when it is desired to precipitate the resin.

After holding the pulp-resin-size mixture in the mix chest for a minimum average retention time of one hour, it is pumped to the machine chest. Acid and alum are added to the machine chest to reduce the pH of the fiber slurry to a value of 4.7–5.0. The alum is added in a constant amount within the range from 0.2 to 0.25%, based on the weight of the dry fiber and causes some reduction in the pH. The further reduction in pH to the value of 4.7 to 5.0 is preferably done by the addition of sulfuric acid. Both the alum and the acid are diluted with water to a low concentration before adding to the chest. The fiber slurry in the machine chest is mixed with the added alum and acid solutions by mechanical stirring, or other suitable means, for a period of approximately 15 minutes, in which time the resin content will have been precipitated or coagulated and deposited on and within the cellulosic fibers.

It is desired to note at this point that the resin will be precipitated by a pH adjustment in the range of 5.0 to 5.5 without the use of alum. The alum is for the purpose of breaking the wax emulsion to cause the paraffin to coagulate upon the fibers. Also, it is the paraffin size which requires the pH in the range of 4.7 to 5.0, and it is for this reason that the pH is lowered below the value of 5.0. The amount of alum specified above is carefully controlled inasmuch as amounts in excess of that needed for sizing cause a decrease in board strength and do not benefit the sizing. The lower limit of pH is also somewhat critical, inasmuch as if it is reduced below about 4.2, the resulting board will be brittle and have low strength. On the other hand, if the pH is not reduced to about 5.2, the resulting board will have high water absorption properties.

THE FORMING STEP

The "integrally" treated fiber slurry may be formed into a wet lap on any type of board forming equipment such as a vacuum cylinder or a Fourdrinier machine. The fiber is run on the forming machine the same way as for the manufacture of conventional boards. In the commercial plant in which the present invention is in operation, a modified Fourdrinier machine is used in which a 1% to 2% suspension of "integrally" treated fiber in water is flowed onto a moving wire screen, and dewatered by gravity, suction boxes and as a final step, by passing through press rolls. The wet lap must be dewatered sufficiently to give it strength to support its weight without breaking when passed over supporting rollers and between a pair of treating rolls in the next main processing step wherein the "surface" treatment is applied.

THE "SURFACE" TREATMENT

"Surface" treating formulation

After the wet lap is formed, it is ready for application of the resin-containing, fluid mix for the "surface" treatment. The surface treating mix is made up of five components as follows:

1. Carrier component for other materials—water.
2. Reinforcing or binder component—a thermosetting resin—phenol formaldehyde resin.
3. Sizing component—wax emulsion—Hercules Paracol 600 N.
4. Viscosity control component—sodium alginate.
5. Parting or release component—aluminum di-stearate with water-miscible solvent—isopropyl alcohol.

The surface treating composition is prepared so as to contain around 6 to 15% of total solids with the remainder consisting substantially of water. Two specific formulations showing percentages, which are illustrative of but not limited as to range, are shown below:

| Constituent | Formulation No. 1 | Formulation No. 2 |
| --- | --- | --- |
| Solids and constituents other than water: | | |
| Phenolic resin | 5.0 | 13.6 |
| Paraffin emulsion | 1.0 | 1.35 |
| Sodium alginate | 0.1 | 0.1 |
| Aluminum di-stearate | 0.1 | 0.15 |
| Isopropyl Alcohol | 0.3 | 0.3 |
| Total other Constituents | 6.5 | 15.5 |
| Water | 93.5 | 84.5 |
| | 100.0 | 100.0 |

The treating mix prepared in accordance with the above formulation and using a thermosetting resin having characteristics as hereinafter specified, is a free-flowing liquid and free from agglomerated or coagulated particles. The paraffin emulsion and aluminum stearate solids in the treating mix thus prepared are not in solution but are in finely divided solid state in suspension or emulsion. The resin solids may be either in finely divided emulsion form, or may be present partly as finely divided solids in emulsion and partly in solution which will be subsequently precipitated in situ in the wet lap upon further dilution with the water and acid contained in the wet lap. The finely divided solids thus become filterable by the fibers of the wet lap so that the solids are retained in the wet lap while the water is being expressed upon subsequent pressing of the wet lap after the surface treatment. Individual considerations and characteristics for each of the above components of the formulation, and equivalent materials, will be discussed hereinafter after completion of the description of the mechanical aspects of the process.

Mixing the treating materials

The above specified mixture of constituents is prepared in a tank provided with agitating means. Water is first run into the tank and sodium alginate is added slowly to prevent lumping. The water and alginate are mixed for approximately one hour to allow the alginate to go into solution or disperse. Next the resin is added followed by the wax emulsion. The aluminum stearate dispersed in the isopropyl alcohol is added last. pH adjustment may or may not be made depending on the characteristics of the resin. The mixture of the above constituents without pH adjustment results in a semi-solution or suspension having a pH of about 8. From a sizing standpoint it is desirable to adjust the pH to 6.5–7.0; however, with some resins and particularly when the storage limit is being approached, pH adjustment in this range will result in some coagulation. Dilute sulfuric acid is a preferred reagent for adjusting the pH.

Application of surface treating mix

The wet lap after leaving the press rolls is passed over supporting rollers and between a pair of treating or distributing rolls. The treating rolls are driven at wet lap speed and are in firm contact with both sides of the wet lap. Tensioning adjustments are provided to vary the pressure of the roll against the wet lap. The treating mixture is applied by flowing the same onto the sheet ahead of the top distributing roll. The fluid overflows the edge of the sheet into a bottom pan and is picked up from the pan by the lower distributing roll in surface contact with the bottom of the sheet which thereby applies the fluid to the lower side of the sheet. This arrangement is such that a major portion of the treating mix is applied to the smooth top surface. An overflow pipe returns excess fluid from the bottom pan to the supply tank, while maintaining the fluid in the bottom pan at a constant level.

The distributing rolls, particularly the upper roll, pick up from the surfaces of the wet lap a considerable amount of loose fibers in the manner of lint which tend to become added to the treating mix and will in time render the mix unusable. It has therefore been found advantageous, as a means of preventing the addition of such fibers to the treating mix, to provide a wiping bar on the back side of the treating roll which holds and accumulates the loose fibers so picked up. The accumulation is then occasionally removed.

It should be understood that while this treatment is referred to herein as a "surface" treatment because the treating mix is applied to the surface, the solid materials are in fact caused to be impregnated into the soft, porous wet lap for a substantial depth but to an irregular extent; i. e., the penetration is not to a uniform depth throughout the surface area, but may vary several hundredths of an inch in thickness. Also, the concentrations of the treating solids in the surface layers decrease in proportion to the depth of penetration. These phenomena are desirable inasmuch as it provides a stronger bond of the twice treated surface volume to the once treated interior than would be the case if the depth of penetration were uniform.

*Amount and rate of application of treating mix*

The amount of solids desired to be added to the board by the surface treatment and the depth of treatment, depend upon the characteristics desired in the final product, and also upon the thickness and characteristics of the board in its wet lap pre-form. In the preferred embodiment the treating mix is applied so as to provide solids at the rate of 15 to 20 lbs. per thousand square feet of board to be divided between the two surfaces as desired. The percentage or ratio in terms of parts treating solids to parts of fiber (dry weight) will obviously vary with the thickness of the board. For example, the treating mix is applied so as to provide 2 parts treating solids to 100 parts by weight of the dry fiber in the board for boards of thickness of 1/8" to 3/16". For thicker boards, the proportions of solids from the treating mix to the dry weight of the fiber in the board should preferably be reduced since the proportion of surface volume to total volume is less. For a 1/4" thickness board, 1.5 parts by weight of solid content from the treating mix to 100 parts by weight of fiber in the board, are recommended. It will thus be seen that equivalency in amount of treatment for boards of different thickness is measured in weight of treating solids per unit of surface area and not in proportion to the dry weight of the fiber in the board.

The treating solids may be usefully added in a wide range of amounts, the lower limit being the amount per unit area which will provide a measurable improvement in board properties. This amount is in the vicinity of about 5 lbs. per thousand square feet. The upper limit is theoretically limited only by the saturation value of the wet lap, being about 25% or 310 lbs. per thousand sq. ft. for a 1/8" board. However, the upper limit is practically limited by economic considerations and the law of diminishing returns as to improvement obtained. A preferred range for addition of treating solids is considered to be from 10 to 40 lbs. per thousand sq. ft. of board.

In this connection, it may be pointed out that the "surface" treatment of the instant invention may be used to provide substantially complete penetration of the treating mix to the center of the wet lap, particularly where extremely high strength boards are desired. However, application of the treating mix to such an extent fails to accomplish the advantages of economy obtained by a substantial but limited penetration which thereby provides the improved strength and water resistance to the board in its outer surface layers where the improved properties are most in evidence, and which avoids the use of the relatively expensive treating materials in the interior of the board where the improvement to be contributed by such materials will be less evident and less useful. Application of the parting or release component to only the surface layers of the mat is particularly efficacious, as the amount of this component contained internally of the board serves no useful purpose.

The treating mix in its application to the two surfaces of the wet lap may be divided in any manner desired. The method of application above described assures the addition of a major portion to the upper surface. This is desired, since the upper surface is the smooth finished side of the board and will therefore be the side exposed to use. (The lower surface rests on a breathing screen in the hot press.) Since the treating mix penetrates a substantial distance into the board without forming a definite line of demarcation, the proportions of the solids added to the board as between the upper and lower surface may be divided with as much as 95% in the upper surface without causing warping as would occur where a resin is applied merely as a film or surface coating in unequal amounts to the two sides of a board. In fact, application of the entire amount of treating mix to one surface in the manner and under the conditions disclosed herein will not result in appreciable warping of the board.

The amount of solids added by the treating mix is controlled by the rate of application of the liquid mix to the wet lap and the percentage of solids in the treating mixture. The rate at which the treating mix is applied to the sheet can be controlled within limits by the pressure of the top roll and by the area of the pool ahead of the top or distributing roll. The greater the rate of discharge the larger will be the pool which forms ahead of the roll, and the wider the pool, the longer the board will be subjected to impregnating action of the fluid. The rate of application of the treating mix is most easily controlled by viscosity adjustment of the fluid, and it is for this purpose that a viscosity control component is incorporated in the treating mix. The particle size of the finely divided solids contained in the treating mix in emulsion or suspension form, as well as the relative percentage of resin in solution, also bear importantly upon the rate of impregnation. The more finely divided the solids, the greater will be the depth to which, and consequently the rate at which, they are absorbed in the mat. If the solid particles are too large, penetration will occur to only a limited extent, and the capacity of the porous mat to absorb the treating liquid will be reduced.

The texture of the wet lap with respect to fiber size, porosity and density are important factors affecting the rate of impregnation which will take place and also are basic in determining the amount of impregnation possible, regardless of rate. The effect of these factors on impregnation, once the mat is formed, is largely beyond control, except by control of the speed of movement of the mat or wet lap through the treating rolls. For this reason the control of the pulp quality with reference to the desired end product, is important. A fine textured, uniform size pulp fiber will absorb less treating fluid than a coarse textured fiber. The denser the wet lap, the less treating mix will be absorbed. On the other hand, the more porous the wet lap, the more treating fluid will be absorbed.

HOT-PRESSING OPERATION

The wet lap, which contains the resin added integrally to the fiber slurry in the mix chest, and the additional treating solids in the surface volume imparted by the surface treatment, is now ready for the hot press. The press temperature, and the time in the press, affect the cure of the board and consequently the properties of the board. The hydraulic pressures applied during pressing largely determine the density of the finished product, assuming that a cured board is produced with any given pressure cycle. Since strength increases as the density increases, the objective in pressing treated board has been to use press cycles resulting in the highest feasible density. While the invention is not necessarily limited to the making of boards of any particular density, a density of .9 to 1.1 is a preferred objective.

Various pressing cycles with regard to pressure, time, and temperature may be employed, so long as the board is held under pressure and heat for a sufficient time to cause the fibers to become coalesced and consolidated into a hard, dense, rigid product and to cause the thermosetting resin to advance sufficiently to become thermoset. Maximum temperatures for the treated board of the present invention are lower than those which may be generally used in the manufacture of conventional boards, being limited by sticking tendencies and "build-up" of board material on the caul plates of the press, which is probably due to the resin constituent. A preferred temperature is that provided by saturated steam pressure in the range from 120 to 170 lbs. per sq. in. gauge which is 350° to 375° F.

A preferred total time of hot pressing for $\frac{1}{8}''$ board is 11 to 12 minutes; for $\frac{3}{16}''$ board from 13 to 14 minutes; and for $\frac{1}{4}''$ board from 15 to 17 minutes. It can generally be said that the hot press times and pressures ordinarily required will be adequate for advancing the resin to fully thermoset stage, inasmuch as the resin itself becomes thermoset with a period of time of about 5 minutes and at a minimum temperature of about 275° F. Maximum times and pressures are governed by the general objectives and practicalities of the hot press operation and the properties of the board desired.

A typical pressing cycle for a 1.0 to 1.05 density (specific gravity) board of $\frac{1}{8}''$ thickness is to press at 600 pounds per square inch for 30 seconds and then to release the pressure to 100 pounds per square inch for 12 minutes, with the presses heated to a temperature of 350° F. Other pressure cycles for use on $\frac{1}{8}''$ to $\frac{1}{4}''$ boards, with the presses maintained at a temperature of 355° F., are as shown in Table I, below:

TABLE I

| Press Cycle Steps | $\frac{1}{8}''$ to $\frac{3}{16}''$ boards | | $\frac{1}{4}''$ boards | |
|---|---|---|---|---|
| | Pressure, p. s. i. | Time | Pressure, p. s. i. | Time |
| Initial | 675 | 5 sec | 675 | 5 sec. |
| Time to breathing | | 15 sec | | 15 sec. |
| Breathing | 20 | 1 min | 20 | 1½ min. |
| Intermediate | 110 | 2 min | 70 | 2 min. |
| Holding | 270–350 | (¹) | 180 | (²) |

¹ Remainder of time out of a total of 11 to 14 min. depending on thickness of board.
² Balance of time out of a total time of 15½–16½ minutes.

The build-up of board material adhering to the press wires or screens and the caul plates of the press has been found to be greater when the board is treated with resin as herein disclosed, than in the case of standard or conventional untreated boards. It is therefore desirable to clean the press wires or screens and cauls more often as too great a build-up diminishes water removal and may cause dense spots when pressing treated board. It has also been found that more time is required in the humidification chamber to get the same amount of moisture into treated board than is required for standard or conventional untreated board.

The completed, compressed product is a mixture of fiber and resin which has become coalesced and consolidated into an inseparable, infusible product. The resin provides a reinforcing binder and is rendered insoluble in water and organic solvents by the heat setting cure to which it is subjected in the hot press operation. Boards of this general nature having a thermosetting resin binder have been manufactured heretofore, but not with the combination of an integral treatment and a surface treatment, and particularly where the surface treatment is applied to the board while still in wet lap stage. By means of this treatment, the resin and other treating solids provided by the surface treating mix are uniformly dispersed as finely divided particles in the surface layers of the wet lap, with the concentrations of the particles with respect to fiber decreasing in proportion to depth of penetration. The treating solids have been so blended and graded into the fiber sheet that no definite line of demarcation is apparent. There is no coating or surface layer to chip or flake off and impair working properties of the board.

The degree of improvement in the boards prepared by the process of the present invention in comparison with boards prepared by conventional process treatments, and in comparison with boards provided with an "integral" treatment as described herein, but without the "surface" treatment, is shown in the following table.

TABLE II

| Test | $\frac{1}{8}''$ Thickness Board | | |
|---|---|---|---|
| | Completely Treated Board | "Integral" Treatment Only | Conventionally Prepared Board |
| Transverse strength, p. s. i. (modulus of rupture in static bending) | 9,000 | 7,300 | 4,600 |
| Water absorption, percent (24 hrs. at 70° F.) | 10.8 | 18.2 | 24.2 |
| Swelling in water, percent (24 hrs.) | 5.8 | 10.1 | 16.8 |
| Specific Gravity (Density) | 1.03 | 1.03 | .99 |

Each of the three types of boards tested above were prepared from wood fiber of the same quality and species, and were prepared by processes employing the same manipulative steps as described herein, except for variations in the chemical materials added. The completely treated boards received the full chemical treatment of the present invention. The "integral" treatment only boards received the "integral" treatment described herein but received no "surface" treatment. The conventionally prepared board received nothing more than the conventional addition of rosin-wax size in amount of about 1% based on the dry weight of fiber. The above test values for the completely treated board and the "integral" treatment only boards are average results for four boards of each type. The tests reported for the conventionally prepared board are results of tests of a board which are considered typical. Modulus of rupture values for completely treated boards have been obtained as high as 10,900 p. s. i. and water absorption values are frequently obtained as low as 7% to 8%. Variations in results are inevitable as is well known in this art.

Chemical resistance of boards made by the process of the present invention has been found higher than that of boards made with drying oils. Improved chemical resistance is important where the board will be used for table tops, drainboards, showers and bathrooms, and exposed to the action of soaps and cleaners.

VARIATIONS AND MATERIALS

It will be understood from the foregoing description that the contribution to the art made by the present invention resides principally in the surface treating step, and in the formulation of materials used in making this treatment. The other steps employed in the preparing of the board described herein are more or less conventional, and are varied herein only as it is found to be necessary in contributing to the production of a more improved board when using the surface treating step of the present invention. For instance, while the preparation of the fiber is important as hereinabove described, suitable fibers may be prepared by various methods well known in the art. The wet lap or pre-form may be formed by various methods known to the art.

The addition of wax emulsion during the integral treating step is a customary practice in the prior art, and is optional in the present invention. One of the materials most commonly used is a paraffin wax emulsion. The wax emulsion may be any one of a number of commercial preparations usually employing paraffin wax dispersed in water by an emulsifying agent. A paraffin wax emulsion is conveniently available commercially in the product sold by Hercules Powder Company under the trade name "Paracol 600-N," which is 49% solids, and is an acid stable type of wax emulsion. Molten paraffin or petrolatum may be used in place of wax emulsion in the manner well known in the art. Other sizing materials known to the art may also be used during the integral treatment, as, for instance, rosin paper maker's size.

The thermosetting resins used during both the "integral" treatment and "surface" treatments are preferably phenol-formaldehyde resins having the characteristics herein specified. Other thermosetting resins may be used such as the condensation products of phenol with other lower aliphatic aldehydes, benzaldehyde, or furfural. Various other phenols used in the art for forming condensation products with aldehydes, such as xylenol, resorcinol, etc. may be used. Also, urea-aldehyde resins, melamine-aldehyde resins, etc. may be used.

The materials used for causing the resin to precipitate upon the fibers are not critical, any suitable acid material being satisfactory.

It is important and critical to the invention that the surface treating mix be applied to the board in wet lap form, or, at least, before the board has been subjected to heat and pressure which would cure the resin introduced by the integral treatment. Boards which have already been pressed to the point where the wood fiber has been consolidated and coalesced will not be as receptive to impregnation by the treating mix, and if an integral resin has already been employed, the board will be still more impervious to impregnation by the treating mix. Under such circumstances, the application of the surface treatment would result in the formation of merely a coating of substantially uniform thickness, as distinguished from the irregular penetrating effect which is obtained in accordance with the present invention.

Methods other than the distributing rolls described herein may be used to apply the surface treating mix. For instance, the treating mix may be sprayed upon the surface of the wet lap. Spraying is particularly useful where resins are used which do not have good acid tolerance.

The hot pressing may be done by methods and apparatus well known in the art, provided that there be sufficient pressure, temperature, and time, to coalesce and consolidate the wood fibers and to effect the cure of the thermosetting resin. While hot pressing apparatus of various designs may be used, it is preferred to use a multiple opening press and loader of the type disclosed in copending United States patent application of Orcutt W. Frost, Serial No. 81,569, filed March 15, 1949, for Hot Plate Press Loader.

COMPOSITION OF THE SURFACE TREATING MIX

The surface treating mix preferably comprises five components as hereinbefore described. While best results are obtained by use of all five components, not all the components are essential. A carrier component or vehicle is necessary, which is usually water. From the standpoint of the teaching of applying the surface treating mix to a wet lap or pre-form while still wet, the existence of a solid component carried by the carrier which contributes improved properties to the board is all that is further necessary. The solid component may be either the reinforcing or binder component, usually a thermosetting resin, or a sizing component, usually a wax emulsion, or both. However, from the standpoint of providing an improved product, the presence of a thermosetting resin as a binder component is necessary. It is highly desirable, although not strictly necessary, that the sizing component be added. The addition of a viscosity control component becomes necessary only in its ancillary function of controlling the rate of application of the solids in the treating mix. The more viscous the mix is made, the less will be its absorption by the wet lap. The parting or release component is added, both to give improved finish properties to the board, and also to facilitate operation of the hot presses. Each of the above components will now be discussed in detail.

*Reinforcing or binding component.*—This is preferably and most commonly a thermosetting phenolic resin of the phenol-formaldehyde type. When a phenol-formaldehyde resin is used it is desired that it be in the "A" stage, wherein it is soluble in water, but that the water-solubility tolerance limits are such that the resin is easily precipitated in finely divided particles which are then dispersed as an emulsion, so that when impregnated in the mat, the resin particles will be retained by the fibers in a sort of filtering process, and will not migrate out of the press with the water during expressing of the water in the hot press, as would occur if the resin were in true solution form. The particle size in the emulsion must be small enough to allow penetration into the wet sheet and give a depth of treatment. Emulsion stability is necessary so that storage will not result in settling out or coagulation. The emulsion characteristics are provided by using a resin of limited water solubility, for example, one having a dilution limit of ten volumes of water to one volume resin. When such a resin is diluted with more than ten volumes of water to one volume of resin, it forms an emulsion having the suitable particle size. Dilution limits of one part resin to from five to twenty parts water have been found satisfactory. Resins with higher dilution limits have been found more stable than those with lower dilution limits.

The percentage concentration of the resin solids in the surface treating mix is correlated with the water dilution limit of the resin employed so as to regulate the amount of resin solids in solution and the amount in dispersed, finely divided solid form. Some of the resin solids are usually still in solution form in the treating mix, but the water dilution limit is so nearly approached, that the resin solids content in solution will precipitate upon the further dilution provided by contact with the water in the wet lap. The acidity of the wet lap which is occasioned by the lowering of the pH as a part of the prior "integral" treatment also contributes to precipitation of any resin solids contained in solution upon penetration of the surface treating mix into the wet lap.

A certain degree of tolerance for mild acidic conditions and acid forming materials such as aluminum sulfate is desirable when these materials will have been used in the formation of the wet lap, as, otherwise, the presence of these materials in the wet lap would cause the resin in the treating mix to coagulate and become sticky before penetration had occurred. This would cause gumming upon of the distributing roll, and possibly sticking of the wet lap to the distributing roll. The coagulated resin forms globules which when returned to the storage tank via the overflow impair their reuse for impregnation purposes. A specific example of a resin which meets the above requirements is that manufactured by American Marietta Company under the name "Amres No. 6110," which is a liquid resin having 50% resin solids content.

Another resin which may be used is "Synco No. 721" manufactured by Snyder Chemical Co. of Bethel, Connecticut. It is a liquid solution containing 50% resin solids. This resin does not possess the degree of acid tolerance required for applying in a liquid mix ahead of a distributing roll as is done in the preferred embodiment described herein. It is therefore necessary, when using a resin of low acid tolerance to apply the treating mix by spraying. Another resin of low acid tolerance which is otherwise satisfactory is No. 61X5045 manufactured by American Marietta Company.

While preferred percentage proportions of the resin solids in the surface treating mix are within the range from 5.0% to 15.0%, it will be appreciated that these values are dependent on the amount of dilution of the mix and the water dilution limits of the resin, and that the essential limitations are that the concentration of the resin be correlated with the rate of application, to the end that the desired amount of resin solids may be added to the wet lap during the surface treatment. The concentration may therefore be reduced to relatively small amounts, less than 5%, and still obtain the same treating effect if the rate of application is increased to compensate for reduction in concentration. Or, as a corollary, the rate of application per unit volume of treating mix may be kept constant, and the rate of application of resin solids will then be varied as the concentration in the mix is varied. The lower limit of concentration may therefore be considered as that amount which will provide sufficient resin to contribute improved strength and water resistance, and the upper limit, aside from possible operating and working difficulties, is limited only by the amount of resin solids which can be prepared in free flowing, liquid form, and may, therefore, theoretically, range as high as 50% solids.

*Sizing Component.*—A wax emulsion is preferably used for this component. It serves a multiple purpose in that it provides water resistance for the finished product, and serves as a lubricant or release agent in pressing, which aids in obtaining parting of the sheet from the smooth pressing surface. The wax emulsion may utilize various petroleum or vegetable waxes, but paraffin is one of the most suitable and most economical. For incorporation in the surface treating mix, and for the surface treatment, it must be in an emulsion compatible with other materials used in the formula without separation and agglomeration of the particles. The same commercial wax preparation which is mentioned for the integral treatment is suitable here, being "Paracol 600–N" manufactured by the Hercules Powder Company. The percentage range of 1.0 to 1.35 is preferred, but is relative with the solids concentration of the treating mix. The amount in the mix is correlated with the amount of the mix to be added to a unit area of the board, which is from small amounts effective to contribute its properties to the finished board up to amounts considered impractical in the art.

*Viscosity Control Component.*—Viscosity adjustment is for the purpose of controlling the penetration into the sheet, and thereby the quantity, of treating material applied. The viscosity control component must be compatible with other materials in the mix. It is usually desired to add an agent for increasing the viscosity or thickening the material, although, conceivably, if the treating mix were already too viscous, a thinning agent would be required. Sodium alginate and carboxymethyl-cellulose have been used as thickening agents with sodium alginate being preferred. Sodium alginate is available as a commercial preparation under the name "Keltex" manufactured by the Kelco Company of Los Angeles, California. The amount to be added is variable depending on the amount of viscosity adjustment required, but amounts of the order of 0.1% with a total solids concentration of 6 to 15% in the treating mix, will be effective.

*Parting or Release Component.*—The phenolic resin in the treating mix tends to adhere or stick to the stainless steel cauls of the hot press, causing build-up and sticking of fiber and resin. A high melting stearate in fine particle form is advantageously incorporated for the parting or release agent. Either aluminum di-stearate having a melting point of 145° C. or aluminum mono-stearate with a melting point of 155° C., is preferably employed. The stearates are water-insoluble, and, therefore, difficult to disperse in water. They are advantageously added by forming a dispersion of the stearate in a water miscible organic solvent. Methyl or iso-propyl alcohol are preferred for the solvent. The parting or release agent solids are preferably prepared so as to provide particle subdivisions in emulsion or suspension of a size larger than the particles of resin solids, so as to result in deposition closer to the surface of the release agent than of the resin.

It will be understood that any other suitable agent commonly used as a lubricant in the art for facilitating release from molds, may be used for this purpose, provided the same is compatible with the other reagents of the treating mix. The percentage of the parting or release component in the surface treating mix is, like the other constituents, dependent on the total solids concentration in the mix, but is governed ultimately by the amount desired to be added to the surfaces of the board, which may range from small amounts effective to perform its intended function up to larger amounts, with the maximum being limited by practical considerations such as its effect on reducing paintability of the board, or the strength.

*The carrier component.*—In all practical applications, the carrier is water because of its availability and economy. The organic solvent used for making the liquid dispersion of the parting or release agent is, of course, added to the carrier. Water serves as a suspending material for the solid materials that are in particle form, and as a solvent for the soluble materials. The treating mix usually comprises about 6% to 15% of total solids, with the remainder being the carrier, which is substantially all water. However, as previously indicated herein, the percentage of solids to carrier in the composition of the treating mix is variable with operating conditions, the main consideration being that the treating mix carry a sufficient concentration of solid treating materials to enable impregnation of the wet lap with the amount of treating solids desired to be added to the board. Therefore, the concentration of the treating mix is correlated with the rate and manner of application, and the absorbent characteristics of the wet lap being treated.

Having thus described our invention, what we desire to claim and protect by Letters Patent is:

1. The process of making a cellulosic fiber product of the character of lumber which comprises preparing a pulp of wood fibers; forming said pulp into an aqueous slurry; adding to said aqueous slurry a thermosetting resin in proportions of about 1% to 5% by weight of the dry fiber content; precipitating the resin upon said fibers while in said slurry by reducing the acidity of the slurry to a point where the resin precipitates thereby to fix the same in and upon said fibers; preparing a wet lap of said fibers on a board forming machine; applying to the surfaces of said wet lap while still in wet condition a liquid treating mix containing a thermosetting resin, said thermosetting resin being uniformly dispersed as fine solid particles as impregnated in said wet lap, said treating mix being of a concentration and being applied at a rate so as to provide about 10 to 40 pounds of treating solids per thousand square feet of wet lap; and thereafter hot pressing said wet lap simultaneously to cause the fibers to become coalesced and consolidated into a hard, rigid board and to cure the thermosetting resin.

2. The invention of claim 1 wherein the surface treating mix contains a wax in emulsion form.

3. The invention according to claim 1 wherein the surface treating mix comprises a viscosity increasing agent in an amount correlated to control the rate of absorption by the wet lap of the solids in said mix within the limits of 10 to 40 pounds per thousand square feet of wet lap.

4. The invention according to claim 1 in which the surface treating mix contains a parting or release agent for preventing the board from sticking to the caul plates during the hot pressing operation and to facilitate the removal of the board from the hot press.

5. The invention according to claim 1 in which the surface treating mix comprises, in addition to the resin, wax in emulsion form, a viscosity increasing agent in an amount correlated to control the rate of absorption by the wet lap of the treating solids in said mix within the limits of 10 to 40 pounds per thousand square feet of wet lap and a parting or release agent for preventing the board from sticking to the caul plates during the hot pressing operation and to facilitate the removal of the board from the hot press.

6. The invention according to claim 1 wherein the thermosetting resin constituent of said treating mix is present partly in an emulsion of finely divided resin solids and partly in solution having a water dilution limit such that the resin solids content in solution will precipitate upon further dilution by the water and contact with the acidity in said wet lap.

7. The invention according to claim 1 wherein the thermosetting resin constituent of said treating mix is a phenol-formaldehyde resin in aqueous solution having a water dilution limit of from five volumes to twenty volumes of water to one volume of resin.

8. The invention according to claim 1 wherein the thermosetting resin constituent of said treating mix is a phenol-formaldehyde resin in aqueous solution having a water dilution limit of from five volumes to twenty volumes of water to one volume of resin and being resistant to coagulation by acid in a pH range as low as 4.5.

9. The invention according to claim 1 wherein the surface treating mix contains a parting or release agent for preventing the board from sticking to the caul plates during the hot pressing operation, said parting or release agent being present in said mix as an emulsion of finely divided solid particles, said particles of release agent being generally larger than the particles of resin solids, so as to result in deposition closer to the surface of the release agent than of the resin.

10. The process of producing a compressed cellulosic fiber product of the character of lumber which comprises preparing finely divided cellulosic fibers in a wet pre-form; applying to the surface of the said pre-form while wet a liquid treating mix containing a thermosetting resin, said thermosetting resin being uniformly dispersed as fine solid particles in said wet lap and being disposed in the surface layers of said wet lap in concentrations decreasing with depth; and thereafter hot pressing said board simultaneously to cause the fibers to become coalesced and consolidated into a hard rigid board and to cause the thermosetting resin to become thermoset.

11. The process of preparing a compressed fiber product of the character of lumber which comprises mixing finely divided cellulosic fiber with an aqueous solution of a thermosetting resin and precipitating said resin in an amount from 1% to 5% by weight of resin to the weight of the dry fiber by reducing the acidity of the solution to the pH value at which the resin precipitates upon said fibers; forming the resin treated fibers into a wet lap; and while wet applying to the surfaces of said wet lap a surface treating mix containing a thermosetting resin for further impregnating the surfaces of said wet lap to a substantial depth, said resin being deposited by said surface treating mix in finely divided solid form; and thereafter applying heat and pressure simultaneously to cause said cellulosic fiber to become coalesced and consolidated into a dense, hard, rigid board and to cause said thermosetting resin to become thermoset.

12. In the process of producing a high strength, water resistant hardboard from finely divided cellulosic fiber, the steps of first providing said individual fibers before formation into a mat with a coating of a thermosetting resin, thereafter forming said fibers into a wet lap, and while said fibers are still wet; applying additional thermosetting resin in an aqueous vehicle to the surface of said wet lap, and thereafter hot pressing said wet lap into a finished board in a single pressing operation.

13. In the process of producing a hardboard from finely divided cellulosic fiber, the steps of forming a wet lap of said finely divided fiber, supplying an aqueous suspension of finely divided solid treating materials to the surfaces of said wet lap while still wet in a quantity and at a rate sufficient to cause impregnation of the surface of said wet lap to a substantial depth, and thereafter hot pressing said wet lap into a finished board.

14. In the process of preparing a compressed fiber product of the character of lumber, the steps of forming a wet lap of finely divided fiber, impregnating the surfaces of said wet lap with a treating composition comprising from about 1% to about 15% of a thermosetting resin, a wax in a range from about .5% to 1.5%, a viscosity control agent in an amount of about .1%, a release agent in an amount of about .1%, a vehicle miscible with water for said release agent in about .3%, and the remainder of said composition being water; a substantial part of the thermosetting resin, the wax and release agent being present in finely divided solid form maintained as a suspension in said composition, and thereafter hot pressing said wet lap into a finished board.

15. In the process of preparing a compressed fiber product of the character of lumber, the steps of forming a wet lap of finely divided fiber, impregnating the surfaces of said wet lap with a treating composition comprising water as a major proportion of said composition, about 1 to about 15% of a phenol formaldehyde resin, having a substantial part thereof uniformly dispersed as fine solid particles in suspension and a wax emulsion with the wax solids constituting about .5% to 1.5% and thereafter hot pressing said wet lap into a finished board.

16. In the process of preparing a compressed fiber product of the character of lumber, the steps of forming a wet lap of finely divided fiber, impregnating the surfaces of said wet lap with a treating composition comprising water, a thermosetting resin having a water dilution limit of from five to twenty volumes per volume of resin, the resin solids being present partly in solution and partly in finely divided solid form in aqueous suspension, a sizing agent, a viscosity control agent, and a release agent, the sizing and release agents being present in finely divided solid form maintained as a suspension in said composition, and thereafter hot pressing said wet lap into a finished board.

References Cited in the file of this patent

UNITED STATES PATENTS

| Number | Name | Date |
|--------|------|------|
| 1,956,866 | Keller | May 1, 1934 |
| 1,996,070 | Honel | Apr. 2, 1935 |
| 1,999,715 | Billings et al. | Apr. 30, 1935 |
| 2,030,625 | Ellis | Feb. 11, 1936 |
| 2,325,302 | Britt | July 27, 1943 |
| 2,338,602 | Schur | Jan. 4, 1944 |
| 2,357,392 | Francis | Sept. 5, 1944 |
| 2,487,899 | Sherman | Nov. 15, 1949 |

OTHER REFERENCES

Boehm, Notes on Wood, Plywood, and Hardwood, Paper Trade Journal, page 25, June 30, 1949.